United States Patent [19]

Ainscow et al.

[11] 4,283,662
[45] Aug. 11, 1981

[54] LINE SCAN CIRCUITS FOR CATHODE RAY TUBE DISPLAYS

[75] Inventors: Frank Ainscow, Shawford; Edward D. Anwyl, Eastleigh, both of England

[73] Assignee: International Business Machines Corporation, Armonk, N.Y.

[21] Appl. No.: 80,889

[22] Filed: Oct. 1, 1979

[30] Foreign Application Priority Data

Aug. 15, 1979 [GB] United Kingdom ............... 28391/79

[51] Int. Cl.³ ........................ H01J 29/70; H01J 29/72
[52] U.S. Cl. ..................................... 315/364; 358/148
[58] Field of Search ............... 315/411, 399, 364, 387; 358/148, 17

[56] References Cited

U.S. PATENT DOCUMENTS 3,979,640  9/1976  Fischman et al. .................. 315/387
4,028,729  6/1977  Browder ............................. 358/148

Primary Examiner—Theodore M. Blum
Attorney, Agent, or Firm—Frederick D. Poag

[57] ABSTRACT

A line scan circuit for a cathode ray tube display includes a phase detector (3), integrator (4), voltage controlled oscillator (5) and line output stage (6). The integrator, voltage controlled oscillator and line output stage are conventional, but the phase detector is novel. The phase detector compares the phase difference for both the leading and trailing edges of the horizontal synchronization pulses and the line flyback pulses. This forces the line flyback pulses to be centered with respect to the synchronization pulses resulting in improved centering and linearity of the displayed picture.

6 Claims, 7 Drawing Figures

LINE SCAN CIRCUITS FOR CATHODE RAY TUBE DISPLAYS

FIELD OF THE INVENTION

This invention relates to a line scan circuit for a cathode ray tube display apparatus and more particularly to such a line scan circuit incorporating a novel phase detector.

BACKGROUND OF THE INVENTION

In a conventional line scan circuit, such as in the Plessey or Mullard TBA920 integrated circuit, a phase-locked oscillator is synchronized with the incoming horizontal synchronization (H-sync) pulses to provide a control signal to the line output circuit. This ensures that oscillation is maintained in the absence of the H-sync signal, for example, during maintenance in the case of a display terminal, or, in the case of a TV receiver, when untuned, and noise on the incoming signal is smoothed out. The phase relationship between the output and input is very precisely maintained to prevent line tearing and other picture defects.

Flyback voltage pulses occur at the terminals of the yoke of the cathode ray tube (CRT) between successive horizontal scans of the electron beam while the screen is blanked. Due to component tolerances and temperature effects, the flyback voltage pulses may be broadened and unless the broadened pulse falls within the blanking period, picture defects can occur. Conventionally, this problem has been overcome by designing the CRT circuits to allow a broad blanking period between the line scans: however, this has a deleterious effect on the efficiency of the display.

SUMMARY OF THE INVENTION

An object of the present invention is to provide an improved CRT line scan circuit.

According to the present invention, a line scan circuit for a cathode ray tube display apparatus adapted to receive horizontal synchronization pulses and to produce a line scan waveform comprises a phase detector adapted to compare the phase difference between said synchronization pulses and line flyback pulses to produce an output representing the phase difference, an integrator adapted to integrate the output of the phase detector and having its output connected to a voltage controlled oscillator, and a line output stage connected to receive the output of said oscillator to produce said line scan waveform, and is characterized in that said phase detector is adapted to compare the phases of said synchronization and flyback pulses on both their leading and trailing edges and to produce phase difference signals therefrom which cause said flyback pulses to be centered on said synchronization pulses.

BRIEF DESCRIPTION OF THE DRAWINGS

The invention will now be particularly described, by way of example, with reference to the accompanying drawings, in which.

DETAILED DESCRIPTION

Figure 1:
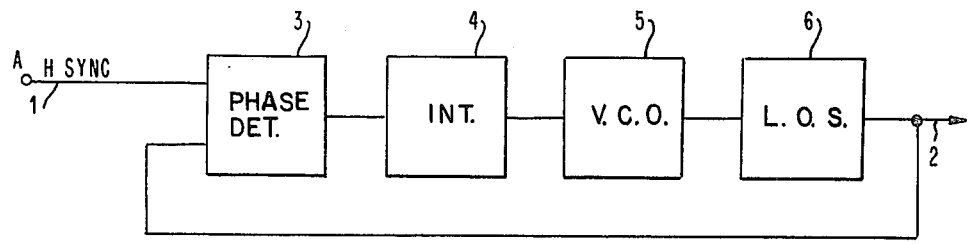
FIG. 1 is a block diagram showing a line scan circuit.

Referring now to FIG. 1, a CRT line scan circuit comprises an input 1 for receiving horizontal synchronization (H-sync) pulses and an output 2 at which a line scan waveform is produced, resulting in line flyback pulses. A phase detector 3 receives the H-sync pulses and the flyback pulses and has its output connected to an integrator 4 which, in turn, is connected to a voltage controlled oscillator (VCO) 5. The output of the voltage controlled oscillator 5 is connected to the line output stage 6 of the line scan circuit. The circuit thus acts as a phase-locked oscillator (PLO), the presence of the integrator 4 identifying the PLO as a type 2 servo, that is there are two integrations in the loop. In accordance with conventional control theory, the integrator characteristic is designed to ensure loop stability.

The integrator 4, voltage controlled oscillator 5, and line output stage 6 are of conventional design and will not be described in detail. On the other hand, the phase detector 3 is of novel design and will be described more fully below. However, before describing the phase detector in more detail, it will be convenient to refer to FIG. 2 which illustrates various waveforms which occur within a CRT line scan circuit.

Figure 2:
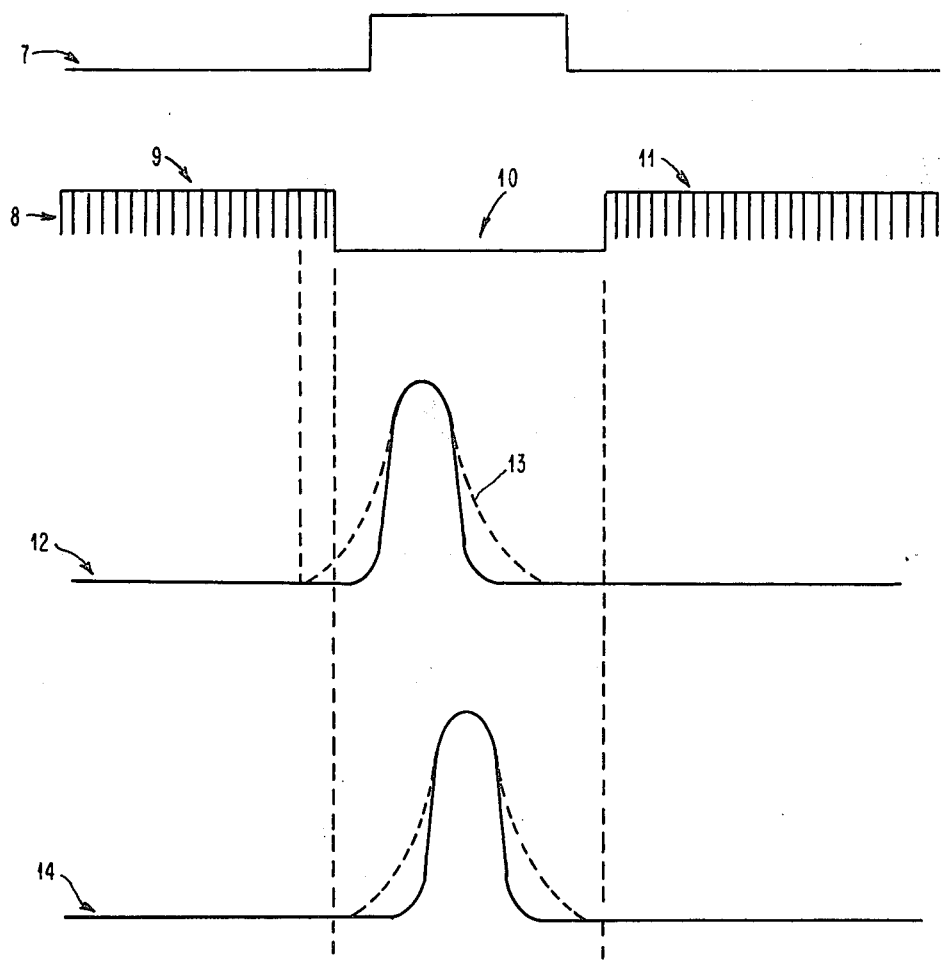
FIG. 2 shows the relationship between various waveforms and illustrates the effect of the present invention compared to a conventional circuit.

Referring now to FIG. 2, waveform 7 represents the H-sync pulse while waveform 8 represents data being displayed on the CRT screen. During line scan period 9, the electron beam will be blanked and unblanked as it scans across the screen in accordance with the data to be displayed. During the line blanking period 10, the beam will flyback while blanked and then during the line scan period 11 will again be blanked and unblanked in accordance with the displayed data. During the line blanking period 10, the beam is moved under the influence of the line flyback pulse represented by waveform 12 in FIG. 2. Conventionally, timing of the line flyback pulse 12 is determined by the leading edge of the H-sync pulse 7. Because of component tolerances, temperature effects, etc., the line flyback pulse will in some cases be widened as represented by the dotted waveform 13. Normally the circuits are designed to accommodate this broadening effect by allowing a sufficiently long blanking period, but it is desirable to shorten the blanking period as much as possible to make the beam available for data display for as high a proportion of the time as possible. If, however, the blanking period is shortened, the broadened pulse can extend into the line scan period 9. The rate of change of current in the yoke of the CRT is proportional to the voltage so that if the line flyback pulse encroaches on the line scan period, there will be distortion of the data being displayed.

Although such distortion might not be unduly noticeable during the viewing of ordinary television pictures, it can be very serious in a video display terminal which is displaying regularly arranged data when any movement becomes instantly visible. In accordance with the principles of the present invention, the line scan waveform is derived from both the leading and trailing edges of the H-sync pulse. Not only does this center the line flyback pulse in the line blanking period, but it ensures accurate centering of the data being displayed on the CRT screen and mitigates the deleterious effects of broadened flyback pulses. This is represented by the waveform 14 in FIG. 2. It will be seen that with the same broadening of the flyback pulse as represented by waveform 13, there is no encroachment on the line scan period 9. If broadening is very extensive, any non-linearity due to the tails of the flyback pulse will appear as a symmetrical distortion of the picture: this is less obvious to the eye than assymetrical distortion.

Figure 3:
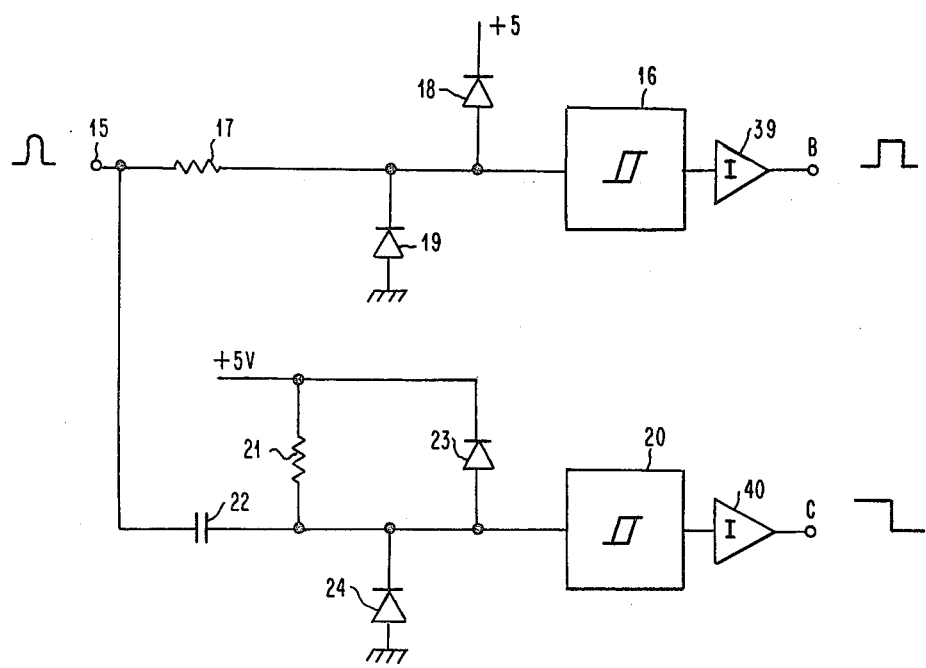
FIG. 3 shows a pulse-shaping circuit arrangement for use in the phase detector of FIG. 1.
Figure 4:
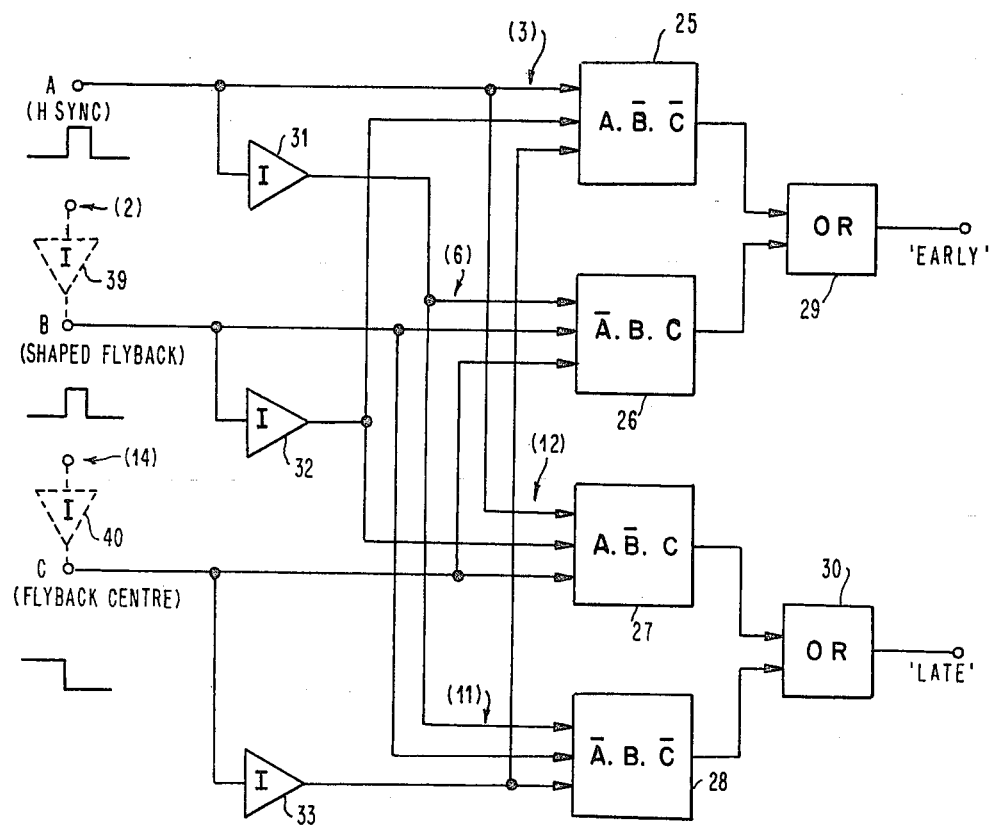
FIG. 4 shows a circuit arrangement for logically combining the pulses produced in the circuit arrangement of FIG. 3.

FIGS. 3 and 4 illustrate the phase detector 3 of FIG. 1 which is designed to compare the phase of the line flyback pulse with both the leading and trailing edges of the H-sync pulse in accordance with the present invention. Referring first to FIG. 3, the line flyback pulses from the line output stage 6, FIG. 1, are applied to an input 15. Pulses appearing at the input 15 are applied to the input of a Schmitt trigger 16 through a resistor 17. Diodes 18 and 19 connected between a voltage supply of +5 volts and ground ensure that the voltage levels are appropriate for the Schmitt trigger 16 which may be constituted by the Schmitt trigger in a Texas Instruments SN 7414 integrated circuit. The output from the trigger 16 is labelled B and represents a shaped flyback pulse which is a square pulse whose leading and trailing edges coincide with those of the line flyback pulse. This signal (B) is used as the timing reference.

The line flyback pulses are also applied to a second Schmitt trigger 20 through a resistor/capacitor differentiating network 21, 22, diodes 23 and 24 again ensuring voltage level compatability for the trigger and subsequent logic. (Alternatively, the resistor 21 and capacitor 22 may be arranged as an integrator with resistor 21 connected between terminal 15 and the input to Schmitt trigger 20 and capacitor 22 connected in parallel with diode 24 to ground.) The output of the Schmitt trigger 20 is labelled C and represents a signal that changes state shortly after the peak of the flyback pulse. Since the peak is prone to variation in shape, some jitter is present on signal C. It is not, therefore, used as a timing reference, but only to distinguish between the leading and trailing edges of the shaped flyback signal B. Schmitt trigger 20 is conveniently provided by the integrated circuit SN 7414 which also provides trigger 16. This circuit provides inverted outputs and to obtain the outputs B and C shown in FIG. 3, inverters 39, 40 are required.

FIG. 4 shows how the H-sync (A), shaped flyback (B) and flyback center or distinguishing (C) signals are combined to produce "early" and "late" signals which are applied to the integrator 4, FIG. 1. The circuit of FIG. 4 comprises four logical AND blocks 25 to 28 which are each labelled with the appropriate logical combination (Boolean notation) which will result in an output. Thus logic block 25 will give an output when the logical combination A AND NOT B AND NOT C is present at its input. The outputs of the logic blocks 25 and 26 are combined in an OR gate 29 to give the "early" pulse and the outputs of the logic blocks 27 and 28 are combined in an OR gate 30 to give the "late" pulse. The NOT A, NOT B, and NOT C signals are obtained by means of invertors 31 to 33 respectively. The circuit of FIG. 4 can be formed using a Texas Instruments SN 74153 integrated circuit, the numbers in brackets representing the pin numbers of that integrated circuit. Should the 74153 circuit be used, the outputs of the Schmitt triggers 16 and 20 of FIG. 3 would be connected respectively to pins numbered (2) and (14) of the integrated circuit. There are two inverters within this integrated circuit which are connected to the pins numbered (2) and (14) and, in practice, comprise the inverters 39 and 40 of FIG. 3.

Figure 5:
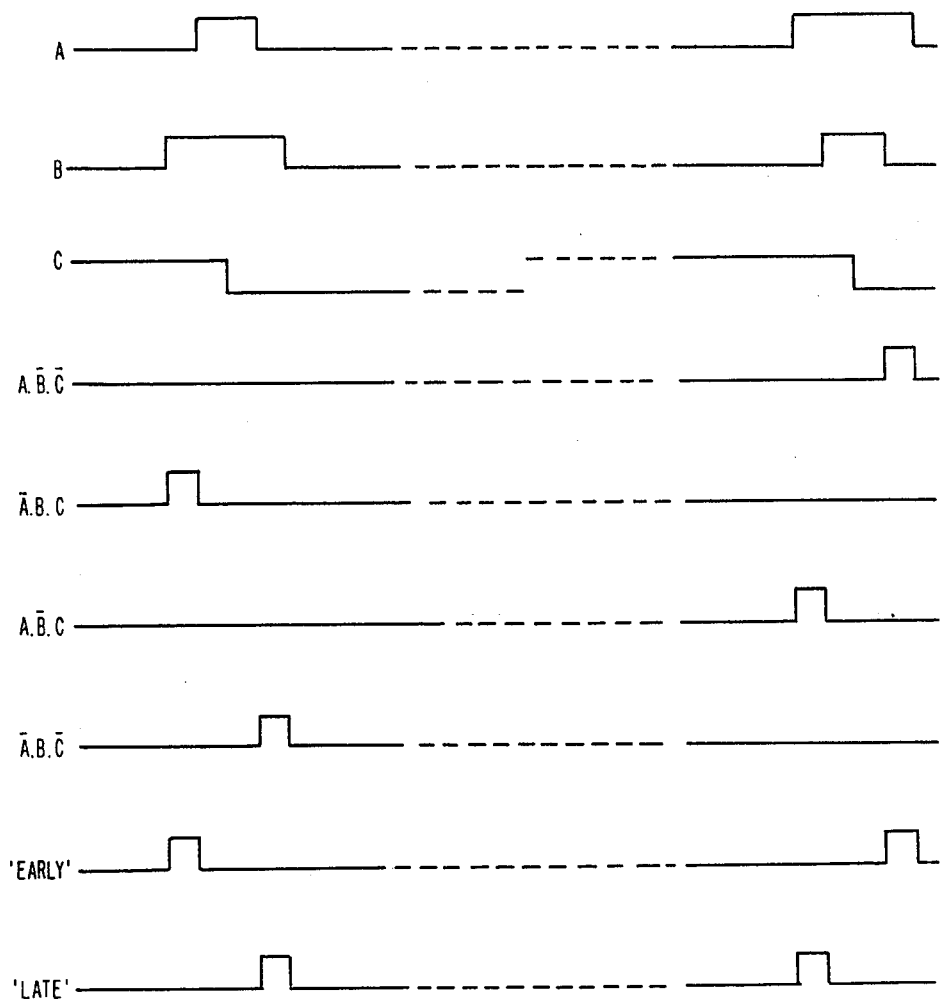
FIGS. 5 and 6 show the relationship between various waveforms produced in the circuits of FIGS. 3 and 4.
Figure 6:
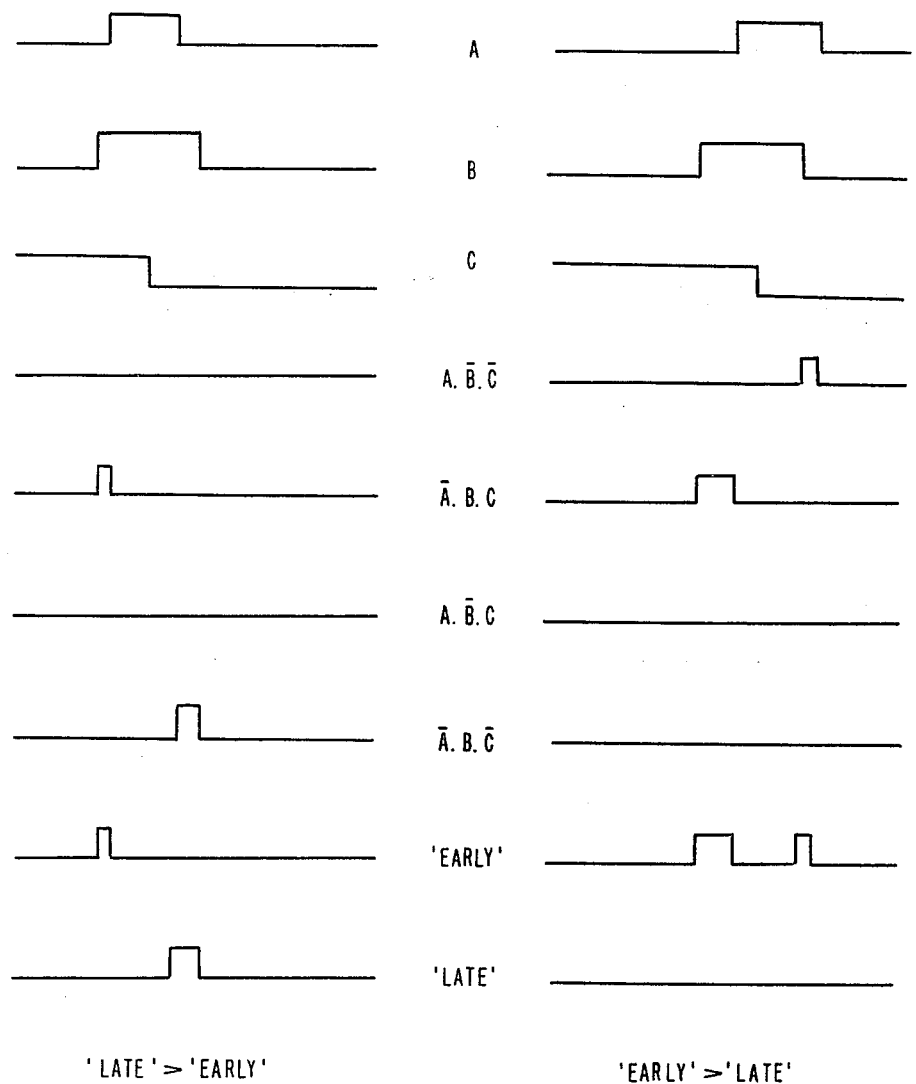

The phase detector compares the phases of the input signals on both leading and trailing edges. Any difference in length of the two pulses when the pulses are in the correct phase results in an "early" pulse at one edge and a "late" pulse at the other edge of equal duration. This effect can be seen in FIG. 5 which shows, on the left hand side, the waveforms for the case where pulse A is shorter than pulse B and, on the right hand side, waveforms for the case where pulse A is longer than pulse B. FIG. 6 shows the waveforms which occur when the flyback pulse is out of phase, occuring late or early with respect to the H-sync pulse. The time integral of the difference between the "early" and "late" pulses is generated by the integrator 4 and is supplied to VCO 5 as an error signal which is used to bring the line flyback pulse into the correct phase relationship with the H-sync pulses. The desired comparison of the integrals of the early and late pulses can be effected in any convenient way, for example, by use of a class B charge pump integrator having two current sources controlled by the early and late pulses, with the two sources connected in parallel with respect to a capacitor.

Figure 7:
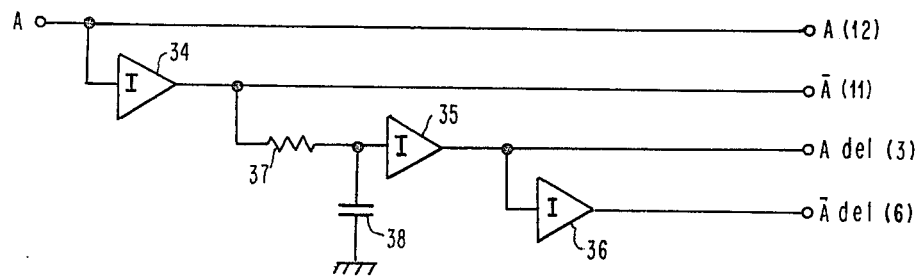
FIG. 7 shows a delay network which can be used to guard against the so-called dead-space condition.

If it is possible, in the particular application, for pulses A and B to be of precisely equal length, it is necessary to guard against the "dead space" condition. This can be done by introducing a delay in certain of the A signal paths. FIG. 7 shows how this delay may be introduced by using a number of inverters 34 to 36 and a resistor/-capacitor network 37, 38. These circuits are provided on the aforementioned integrated circuit SN 7414. The numbers in brackets represent the pin numbers of the SN 74153 integrated circuit of FIG. 4.

What has been described is a line scan circuit for a cathode ray tube employing a novel phase detector circuit. The circuit has been described in terms of SN 7414 and SN 74153 integrated circuits. Those skilled in the art will appreciate that the invention could also be incorporated into a customized integrated circuit incorporating the phase detector, integrator and the voltage controlled oscillator. This could give a significant cost reduction.

The main advantage of using 2-edge phase detection is that the line flyback pulse is forced to center itself on the horizontal synchronization pulse. Any widening of the flyback pulse takes place equally on the leading and trailing edges so that consequently the picture remains centered on the CRT screen. Twice as much widening can be tolerated before the flyback encroaches on the picture area, or alternatively the allowance for widening can be halved. Any non-linearity due to the tails of the flyback pulse appears as a symmetrical distortion of the picture which is less obvious to the eye than the asymmetrical distortion of the prior art.

Other advantages include the use of two samples per cycle instead of one leading to better response from the phase locked oscillator. When the H-sync and square-shaped flyback signals are nominally of equal length, the early and late pulses are nominally zero: this reduces the limitation on gain of the loop due to the dynamic range of the integrator.

We claim:
1. A line scan circuit for a cathode ray tube display adapted to receive horizontal synchronization pulses and to produce a line scan waveform comprising a phase detector adapted to compare the phase difference between said synchronization pulses and line flyback pulses and to produce an output representing the phase difference, an integrator adapted to integrate the output of the phase detector and having its output connected to a voltage controlled oscillator, and a line output stage connected to receive the output of said oscillator to produce said flyback pulses, characterized in that said phase detector is adapted to compare the phases of said synchronization and flyback pulses on both the leading and trailing edges thereof, and to produce phase difference signals therefrom which cause said flyback pulses to be centered on said synchronization pulses.

2. A line scan circuit as claimed in claim 1, characterized in that said phase detector includes a pulse shaping circuit adapted to receive said flyback pulses and to produce therefrom square-shaped flyback pulses whose leading and trailing edges coincide with those of the flyback pulses and a distinguishing signal that changes state in accordance with the peaks of the flyback pulses, in that said square-shaped pulses are used as timing reference signals, and in that said distinguishing signal is used to distinguish between the leading and trailing edges of said square-shaped pulses.

3. A line scan circuit as claimed in claim 2, characterized in that said distinguishing signal and said square-shaped pulses are each produced by a Schmitt trigger.

4. A line scan circuit as claimed in claim 2 or claim 3, characterized in that said phase detector includes digital logical circuits adapted to combine the synchronization and square-shaped pulses with said distinguishing signal to produce a first-type signal indicative of the phase difference between the leading edges of the synchronization and square-shaped pulses and a second-type signal indicative of the phase difference between the trailing edges of the synchronization and square-shaped pulses.

5. A line scan circuit as claimed in claim 4, characterized in that said first-type and second-type signals are produced respectively from the outputs of the first and second OR gates connected to receive respectively the outputs of first and second parts of AND gates, in that one of said first pair or AND gates is connected to give an output in the presence of a synchronizing pulse and the absence of a square-shaped pulse and said distinguishing signal and in that the other of said first pair of AND gates is connected to give an output in the absence of a synchronization pulse and the presence of a square-shaped pulse and said distinguishing signal, and in that one of the second pair of AND gates is connected to give an output in the presence of a synchronization pulse and said distinguishing signal and the absence of a square-shaped pulse and in that the other of said second pair of AND gates is connected to give an output in the absence of a synchronization pulse and said distinguishing signal and the presence of a square-shaped pulse.

6. A line scan circuit as claimed in claim 5, characterized in that said first pair of AND gates are connected to receive delayed synchronization pulses.

* * * * *